(12) United States Patent
Kouda et al.

(10) Patent No.: US 11,323,013 B2
(45) Date of Patent: May 3, 2022

(54) ELECTRIC WORK MACHINE

(71) Applicant: MAKITA CORPORATION, Anjo (JP)

(72) Inventors: Kei Kouda, Anjo (JP); Akira Naito, Anjo (JP); Hideki Abe, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/090,240

(22) Filed: Nov. 5, 2020

(65) Prior Publication Data

US 2021/0057968 A1 Feb. 25, 2021

Related U.S. Application Data

(63) Continuation of application No. 16/460,149, filed on Jul. 2, 2019, now Pat. No. 10,862,376.

(30) Foreign Application Priority Data

Aug. 7, 2018 (JP) .............................. JP2018-148703
Aug. 7, 2018 (JP) .............................. JP2018-148704

(51) Int. Cl.
*F16H 21/18* (2006.01)
*H02K 11/33* (2016.01)
*A01D 69/02* (2006.01)
*A01D 34/78* (2006.01)
*A01D 101/00* (2006.01)

(52) U.S. Cl.
CPC ............. *H02K 11/33* (2016.01); *A01D 34/78* (2013.01); *A01D 69/02* (2013.01); *A01D 2101/00* (2013.01)

(58) Field of Classification Search
CPC ........ H02K 11/33; A01D 34/78; A01D 69/02; A01D 2101/00
See application file for complete search history.

(56) References Cited

U.S. PATENT DOCUMENTS

| | | | |
|---|---|---|---|
| 2015/0207374 A1* | 7/2015 | Tsuiki | H02K 3/12 310/202 |
| 2015/0303857 A1 | 10/2015 | Burke | |
| 2016/0294254 A1* | 10/2016 | Hara | F16H 21/18 |
| 2016/0380510 A1 | 12/2016 | Niwa | |
| 2017/0133902 A1* | 5/2017 | Jang | H02K 3/522 |
| 2018/0013329 A1 | 1/2018 | Aoyama | |

FOREIGN PATENT DOCUMENTS

| | | |
|---|---|---|
| JP | 2001-128396 A | 5/2001 |
| JP | 2002-153003 A | 5/2002 |
| JP | 2012-070583 A | 4/2012 |
| JP | 2012-135176 A | 7/2012 |
| JP | 2017-007068 A | 1/2017 |
| JP | 2018-007527 A | 1/2018 |

* cited by examiner

*Primary Examiner* — Cortez M Cook
(74) *Attorney, Agent, or Firm* — Oliff PLC

(57) ABSTRACT

An electric work machine includes a brushless motor including a stator including a stator core, an electrical insulator located on the stator core, and at least one coil wound around the stator core with the electrical insulator in between, and a rotor rotatable with respect to the stator, and an output unit drivable by the brushless motor. The stator core has a through-hole and/or a recess to lock rotation of the stator with a screw.

12 Claims, 18 Drawing Sheets

ELECTRIC WORK MACHINE

CROSS-REFERENCE TO RELATED APPLICATIONS

This is a Continuation Application of U.S. patent application Ser. No. 16/460,149, filed Jul. 2, 2019, which in turn claims the benefit of priority to Japanese Patent Application No. 2018-148703, filed on Aug. 7, 2018, and Japanese Patent Application No. 2018-148704, filed on Aug. 7, 2018, the entire contents of which are hereby incorporated by reference.

BACKGROUND

1. Technical Field

The present invention relates to an electric work machine including a power tool, a gardening tool such as a lawn mower, and an air compressor for an air tool.

2. Description of the Background

An electric work machine such as a power tool uses a compact, durable brushless motor as its power supply. A known inner-rotor brushless motor includes a cylindrical stator and a rotor disposed inside the stator, as one example is described in Japanese Unexamined Patent Application Publication No. 2017-7068 (Patent Literature 1). In a housing, the stator is locked not to rotate, with engagement recesses on the side surface of an insulator engaged with protrusions on the inner surface of the housing.

The brushless motor including the stator and the rotor has three-phase coils on the stator, which are formed by winding a wire around the teeth of the stator to allow passage of electricity from a drive circuit through a switching element. The coils may be wound by a winding method described in, for example, Japanese Unexamined Patent Application Publication No. 2018-7527 (Patent Literature 2) to satisfy the formula $N = A \times B$, where N is the number of slots per phase, A is the number of serial coils connected in series, and B is the number of parallel coils per phase (N is a positive integer of 3 to 10, A is a positive integer of 1 or greater, and B is a positive integer of 2 or greater) and achieve high output power without increasing the wire diameter.

BRIEF SUMMARY

The stator locked not to rotate at the insulator as described in Patent Literature 1 may have low alignment accuracy due to tolerances. Also, the stator is locked with the degree of reliability dependent on the strength of the resin insulator, and is thus difficult to lock with high reliability.

The method described in Patent Literature 2 cannot reduce the wire diameter any further to produce the same output power when more coils are to be connected in parallel. The coils of the three phases are connected to one another with the connecting wire between the coils routed back and forth between the connecting side of the stator and the opposite side. The connecting wire may be routed in a complex manner depending on the series and parallel arrangements of the coils. The connecting wire may be crossed to have crossing portions that may contact each other and wear under vibrations.

One aspect of the present invention is directed to an electric work machine including a stator locked not to rotate in a highly accurate and reliable manner.

Another aspect of the present invention is directed to an electric work machine including a brushless motor that allows use of a wire with a smaller diameter to achieve the same output power.

An electric work machine according to a first aspect includes
  a brushless motor including
    a stator including a stator core, an electrical insulator located on the stator core, and at least one coil wound around the stator core with the electrical insulator in between, and
    a rotor rotatable with respect to the stator; and
  an output unit drivable by the brushless motor,
  wherein the stator core has a through-hole and/or a recess to lock rotation of the stator with a screw.

An electric work machine according to a second aspect includes
  a brushless motor including
    a stator including a stator core, an electrical insulator located on the stator core, and at least one coil wound around the stator core with the electrical insulator in between, and
    rotor rotatable with respect to the stator;
  a lid located at one axial end of the stator; and
  an output unit drivable by the brushless motor,
  wherein the stator core includes, on an outer circumference, a rotation locking member to be fitted with the lid.

An electric work machine according to a third aspect includes
  a brushless motor including
    a stator including a stator core, an electrical insulator located on the stator core, and at least one coil wound around the stator core with the electrical insulator in between, and
    a rotor rotatable with respect to the stator;
  a lid located at one axial end of the stator; and
  an output unit drivable by the brushless motor,
  wherein the stator core includes, on an outer circumference, a projection to be fitted with the lid to lock rotation of the stator, and
    the projection has a through-hole to receive a screw.

An electric work machine according to a fourth aspect includes
  a brushless motor including
    a stator,
    a rotor, and
    at least one coil including coils in three phases wound around the stator with a delta connection in which each phase includes four or more coils connected in parallel.

An electric work machine according to a fifth aspect includes
  a brushless motor including
    a stator including a first tooth around which a first coil is wound, and a second tooth adjacent to the first tooth and around which a second coil is wound,
    a plurality of metal sheets electrically connected to the first coil and the second coil, and
    a rotor located circumferentially inward from the stator; and
    an output unit drivable by a rotation of the rotor,
    wherein in the stator, an end of the first coil and an end of the second coil are electrically connected to the metal sheets in the same direction.

The structures according to the first to third aspects lock rotation of the stator in a highly accurate and reliable manner.

The structures according to the fourth and fifth aspects allow use of a wire with a smaller diameter than in a star connection to achieve the same output power, and allow use of thinner winding nozzles in a star connection. These structures increase space efficiency, and achieve high output power. More specifically, these structures reduce the weight and the size of the stator.

DETAILED DESCRIPTION

Figure 1:
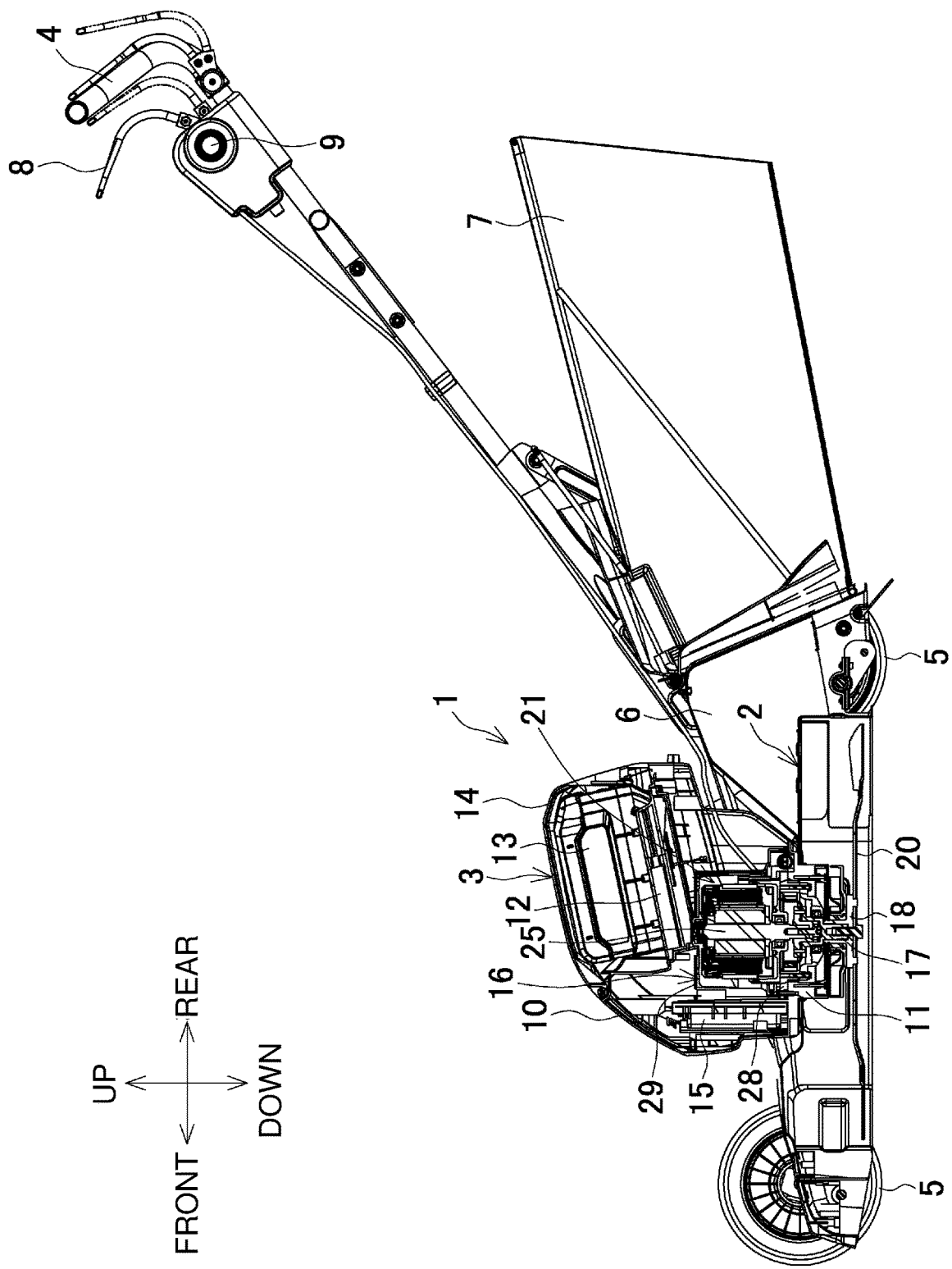
FIG. 1 is a longitudinal central sectional view of a lawn mower.
Figure 2:
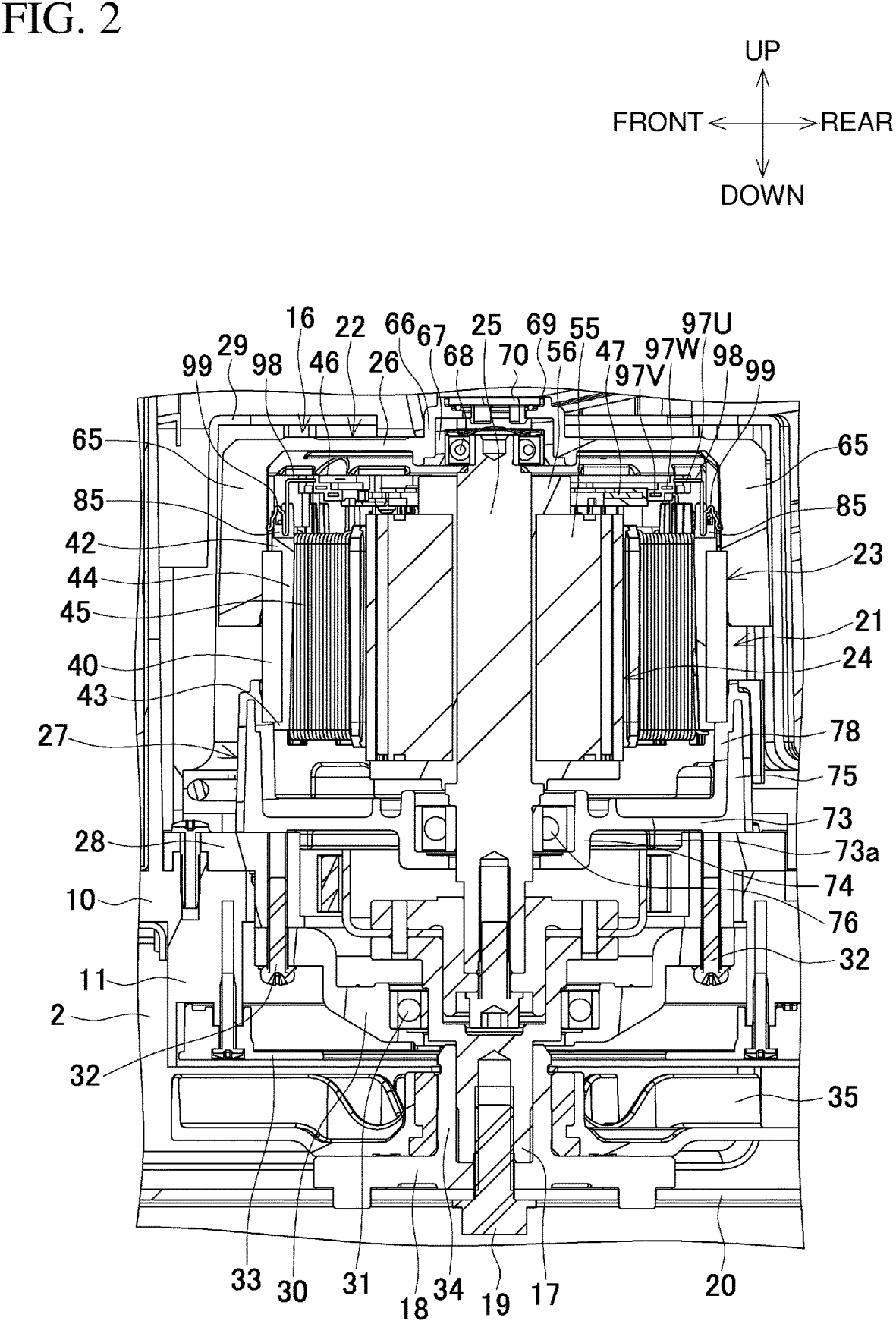
FIG. 2 is an enlarged view of a part including a motor unit.

An electric work machine according to an embodiment will now be described with reference to the drawings.
Lawn Mower
FIG. 1 is a longitudinal central sectional view of a rechargeable lawn mower as an example of an electric work machine. FIG. 2 is an enlarged view of a part including a motor unit.

The lawn mower 1 includes a base 2, a body 3, and a handle 4. The base 2 extends in the front-rear direction, and has an opening in its lower surface. The body 3 is coupled to a central area of the upper side of the base 2. The handle 4 extends obliquely upward from the base 2 toward the rear.

The base 2 includes a pair of front wheels 5 and a pair of rear wheels 5. The base 2 is movable back and forth with the handle 4. Behind the base 2, a rear cover 6 and a grass bag 7 are located under the handle 4. The handle 4 has a switch lever 8 on the rear end. The handle 4 has a lock-off button 9 in front of the switch lever 8 to lock the operation of the switch lever 8 in a normal state. The lock-off button 9 is pressed to unlock the switch lever 8, allowing the switch lever 8 to be pulled.

The body 3 includes a body housing 10 and a cylindrical unit 11. The cylindrical unit 11 has an opening in its lower end. The lower end of the cylindrical unit 11 protrudes into the base 2. The body housing 10 has a battery holder 12 in its upper portion. The battery holder 12 is inclined to have its front portion downward. The battery holder 12 can receive a battery pack 13 as a power supply inserted from its upper rear. The battery holder 12 can be open and closed with a battery cover 14.

The body housing 10 supports, in its front part, a controller 15 including a control circuit board (not shown) to stand erect in the vertical direction. Behind the controller 15, a motor unit 16 is located under the battery holder 12. A rotational shaft 25 of a brushless motor 21 (described later) protrudes downward from the motor unit 16. A spindle 17 is coaxially coupled to the lower end of the rotational shaft 25. The spindle 17 protrudes downward from the cylindrical unit 11 into the base 2. The spindle 17 has, on its lower end, a cutting blade 20, which is a flat plate, attached perpendicular to the spindle 17 with an inner flange 18 and a bolt 19, thus forming an output unit.

Figure 3:
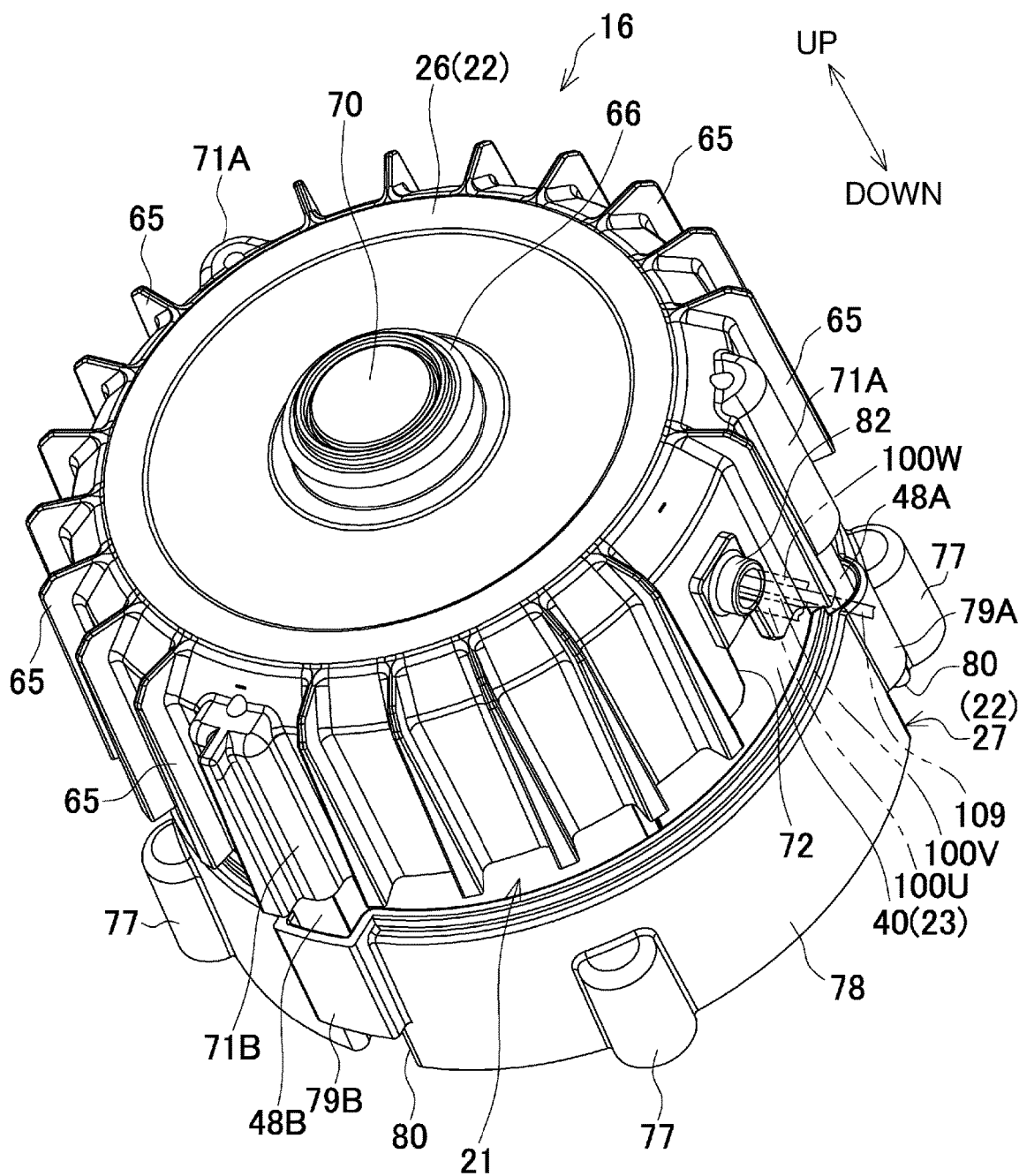
FIG. 3 is a perspective view of the motor unit.
Figure 4:
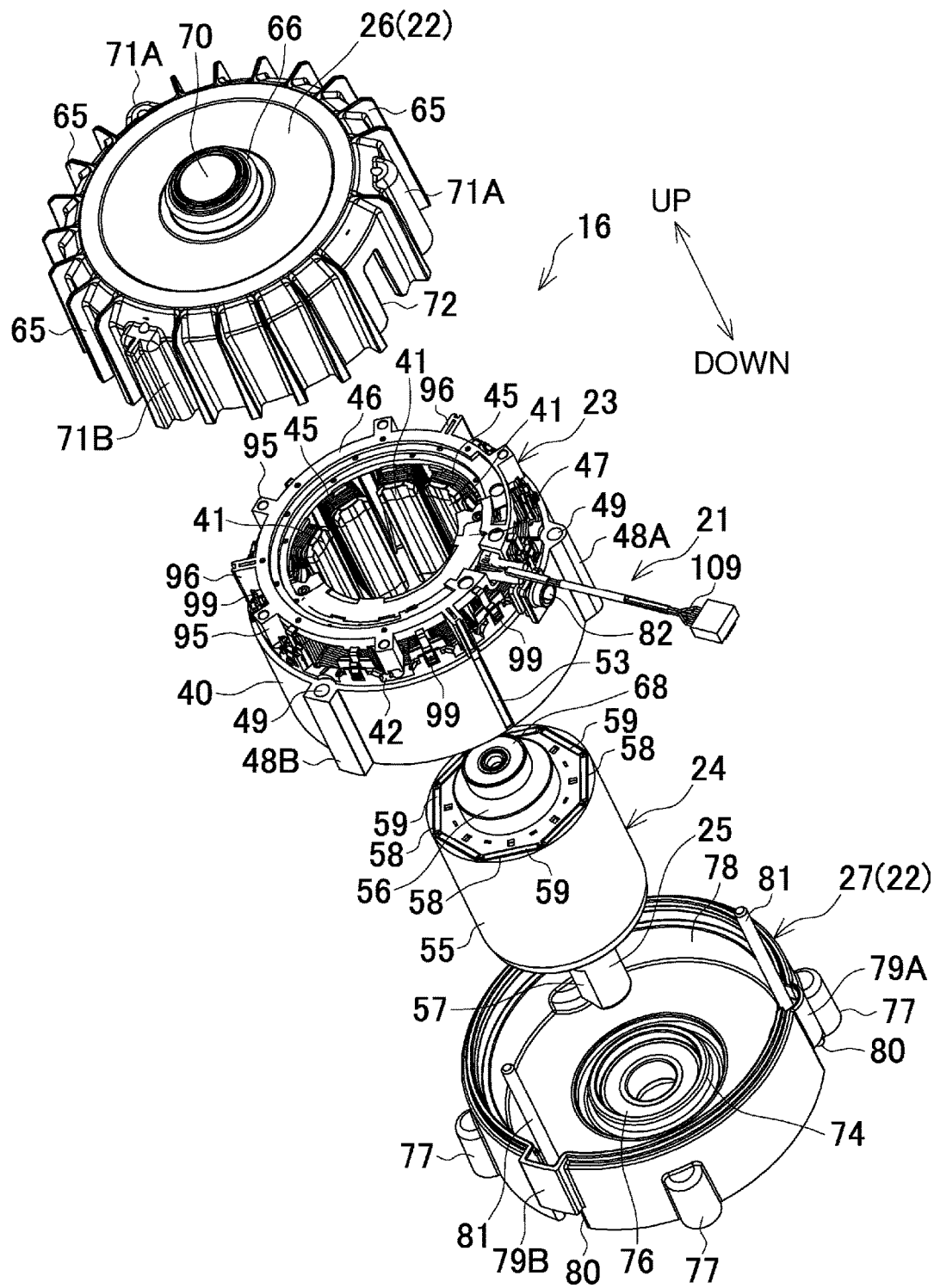
FIG. 4 is an exploded perspective view of the motor unit.

As shown in FIGS. 3 and 4, the motor unit 16 includes the brushless motor 21 and a motor case 22 holding the brushless motor 21. The brushless motor 21 is an inner-rotor motor including a cylindrical stator 23 and a rotor 24. The rotor 24 includes the rotational shaft 25 extending through the stator 23 along the axis. The motor case 22 includes an upper case 26 and a lower case 27, and holds the stator 23 from above and below to axially support the rotational shaft 25. The lower case 27 is mounted on a base 28 located on the cylindrical unit 11. A motor cover 29 is located over the base 28 and covers the motor unit 16 from above.

A bearing retainer 30 is located below the base 28 and axially supports the spindle 17 with a bearing 31. The bearing retainer 30 is mounted on the base 28 with screws 32 from below. The lower end of the spindle 17, which extends through the bearing retainer 30, extends through a baffle plate 33 screwed to the lower end of the cylindrical unit 11, and protrudes into the base 2. The inner flange 18 for attaching the cutting blade 20 has a cylinder 34 into which the lower end of the spindle 17 is fitted. The cylinder 34 has a centrifugal fan 35 on its outer circumference.

Stator

As shown in FIGS. 4 to 7, the stator 23 in the brushless motor 21 includes a stator core 40, an upper insulator 42, a lower insulator 43, an insulating unit 44, and coils 45. The stator core 40 includes a plurality of steel plates 40a (FIG. 8) axially stacked on one another. Each steel plate 40a includes a plurality of (twelve in this example) teeth 41 protruding inwardly. The upper and lower insulators 42 and 43 are resin electrical insulators. The upper insulator 42 is formed integrally with the upper end of the stator core 40, and the lower insulator 43 is formed integrally with the lower end of the stator core 40. The insulating unit 44 is formed from a resin, and covers the inner peripheral surfaces of the stator core 40 and the outer peripheral surface of each tooth 41 excluding the protruding end face. The insulating unit 44 is continuous with the upper and lower insulators 42 and 43. The coils 45 are wound around each tooth 41 with the insulating unit 44 between them. A short-circuiting member 46 and a sensor circuit board 47 are joined to the upper insulator 42. The short-circuiting member 46 is electrically connected to a wire forming the coil 45 to form a three-phase connection. The sensor circuit board 47 detects the rotational position of the rotor 24. The upper and lower insulators 42 and 43, the short-circuiting member 46, and the sensor circuit board 47 will be described in detail later.

The stator core 40 has three ridges (two first ridges 48A and one second ridge 48B) at circumferentially equal intervals on the outer circumferential surface. The first ridges 48A have a tapered cross section with a circumferential width decreasing radially outward from the stator core 40. The second ridge 48B is not tapered but has a rectangular cross section having the same circumferential width in the radial direction. The second ridge 48B is slightly curved (or has a curved surface) to protrude circumferentially outward on the radially outer edge. The ridges 48A and 48B each have a through-hole 49.

Figure 8:
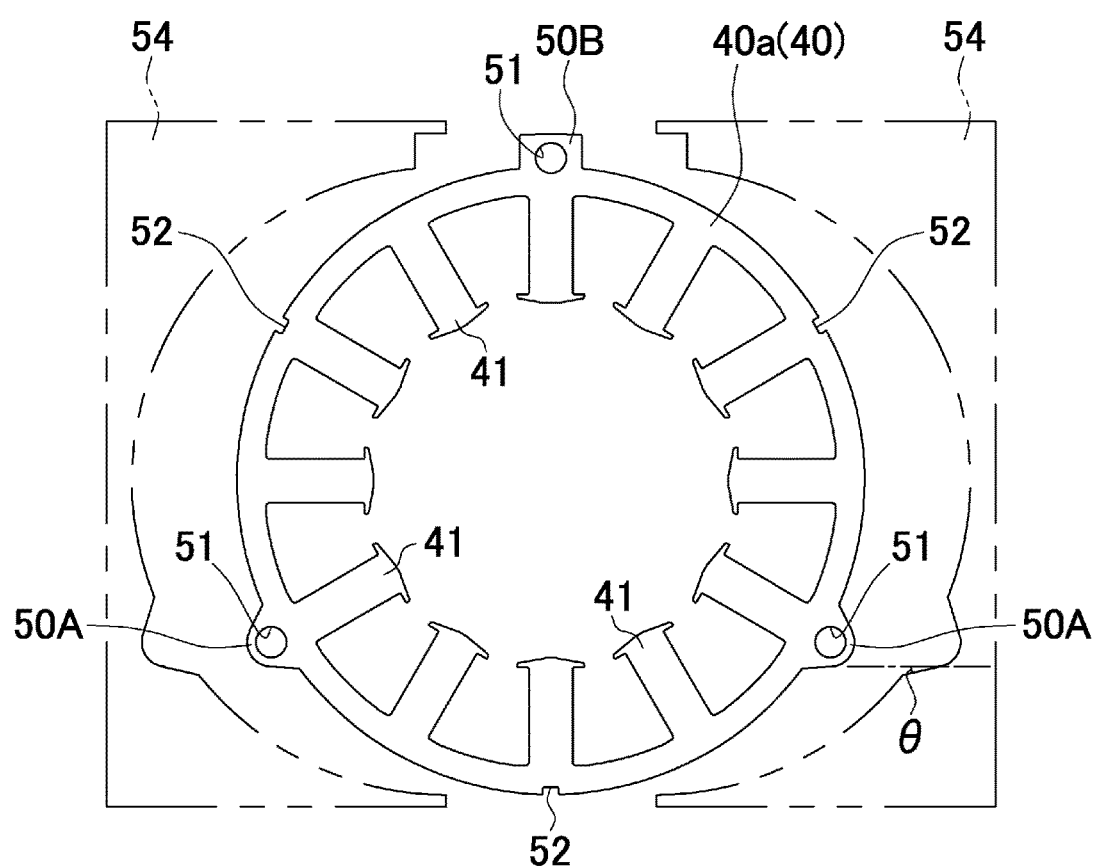
FIG. 8 is a diagram describing a steel plate and split molds for a stator core.

As shown in FIG. 8, the ridges 48A and 48B are formed by protrusions 50A and 50B on each steel plate 40a. The first protrusion 50A is tapered to have a circumferential width decreasing radially outward from the stator core 40. The second protrusion 50B is not tapered but is rectangular and has the same circumferential width in the radial direction. The protrusions 50A and 50B have a through-hole 51. The second protrusion 50B is slightly curved (or has a curved surface) to protrude circumferentially outward on the radially outer edge. A cutout 52 is located between the protrusions 50A and 50B. The plurality of stacked cutouts 52 forms a groove 53 between the ridges 48A and 48B to position the stator.

The first ridges 48A are tapered to prevent interference with a mold in the process of integrally forming the upper and lower insulators 42 and 43 and the insulating unit 44. As indicated with two-dot chain lines in FIG. 8, when the upper and lower insulators 42 and 43 and the insulating unit 44 are formed integrally with the stator core 40 using right and left split molds 54, the two tapered first ridges 48A are located on the right and left to correspond to the right and left split molds 54. The tapered surface thus prevents the first ridges 48A from interfering with the split molds 54 that move laterally in FIG. 8. Each first ridge 48A has a tapering angle of 3 degrees with respect to the moving direction in the example. The angle may be determined in the range of 1 to 10 degrees as appropriate. The second ridge 48B is also slightly curved outward on the edge, preventing interference with the right and left split molds 54.

The rotor 24 includes the rotational shaft 25 extending along the axis of a cylindrical rotor core 55 including a plurality of steel plates that are axially stacked on one another. The rotor core 55 and the rotational shaft 25 are formed integrally using a resin 56. The rotational shaft 25 has a chamfered lower end 57 (FIG. 4).

The rotor core 55 has, in its peripheral portion, a plurality of (eight in this example) magnet slots 58 that are arranged concyclic and extend axially. Each magnet slot 58 receives a permanent magnet plate 59. The rotor core 55 has, at positions inward from the permanent magnet plates 59, spaces (weight saving holes) 60 that are defined by aligning the through-holes in the steel plates 40a except in their upper and lower plates. This reduces the weight of the rotor 24.

Motor Case

The motor case 22 includes the upper case 26 and lower case 27 that are shaped in circular cups and are attached to cover an upper portion and a lower portion of the stator 23.

Figure 5:
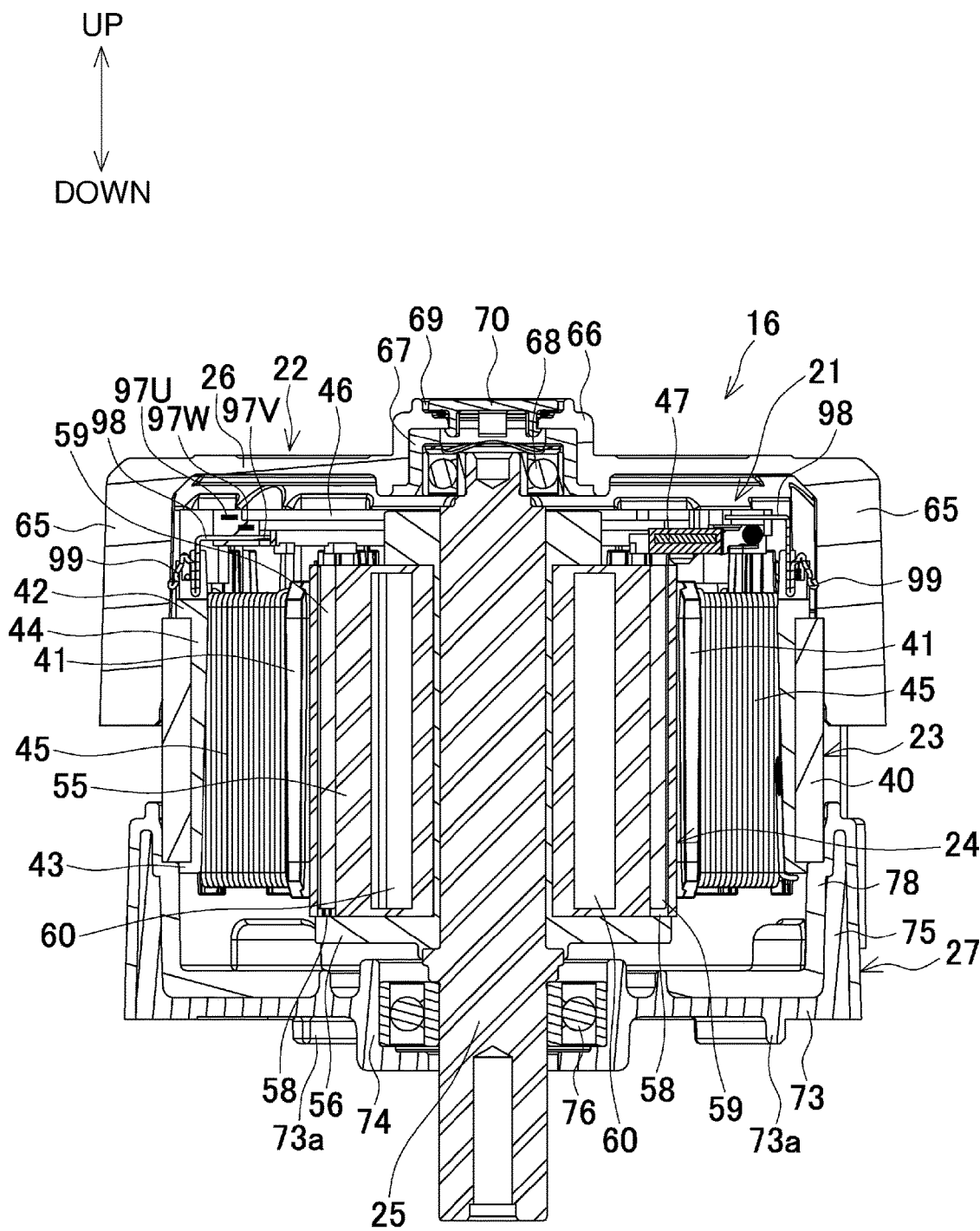
FIG. 5 is a longitudinal sectional view of the motor unit.
Figure 6:
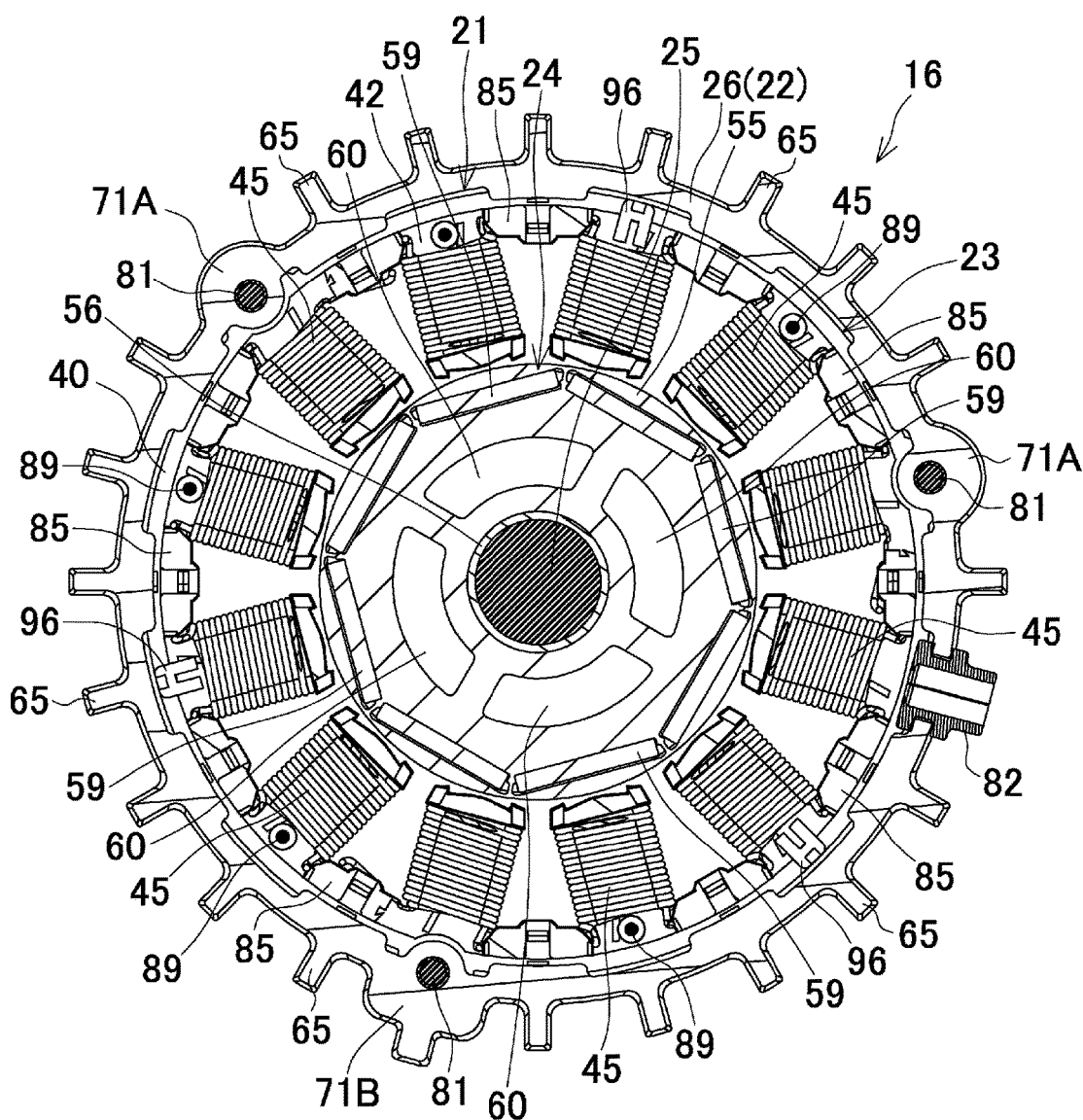
FIG. 6 is a cross-sectional view of an upper case in the motor unit.
Figure 7:
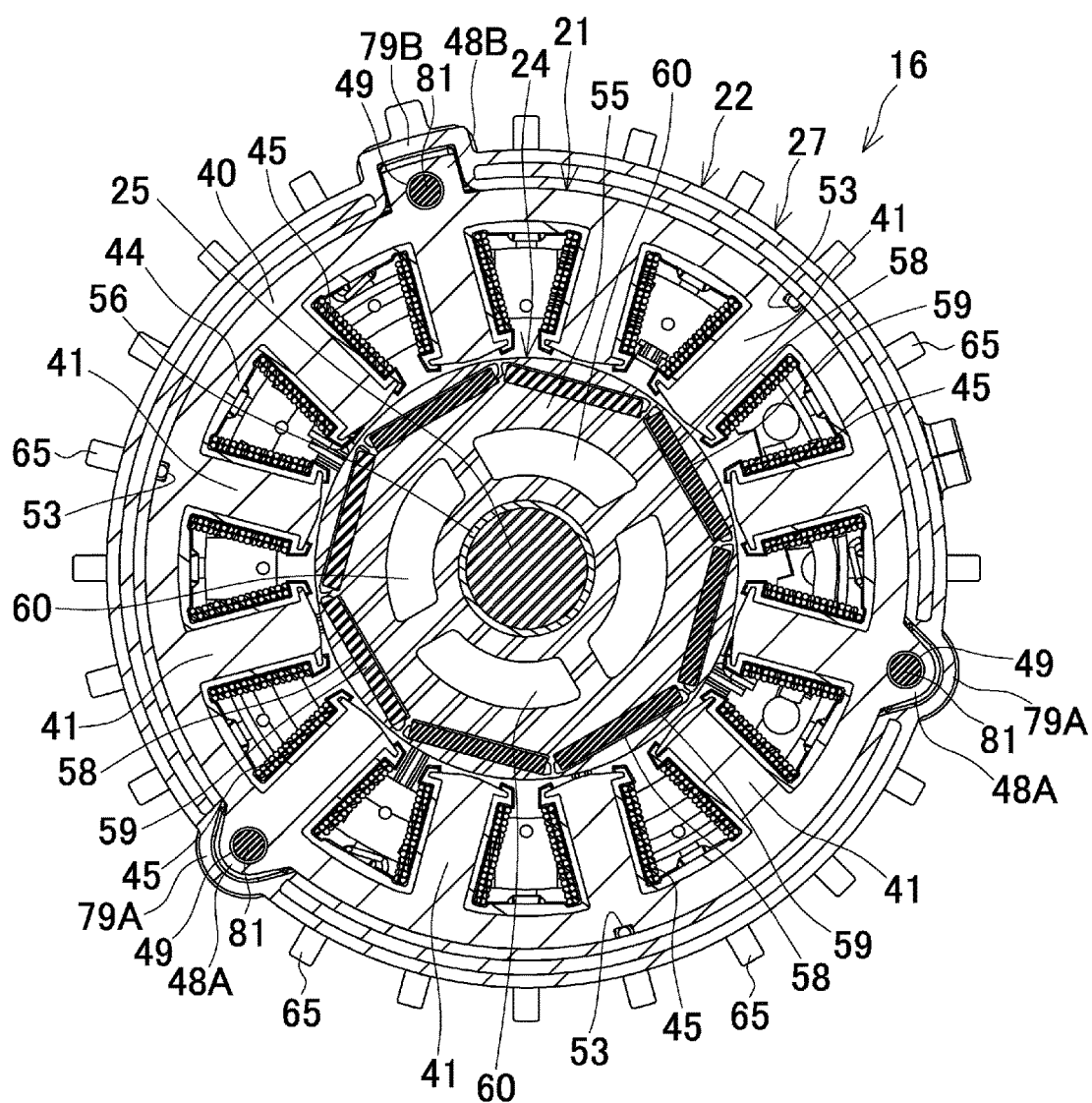
FIG. 7 is a cross-sectional view of a lower case in the motor unit.

The upper case 26 is formed from a non-magnetic material, such as an aluminum alloy. As shown in FIGS. 3 to 5, the upper case 26 has fins 65 for dissipating heat that extend from an outer peripheral area of the upper surface of the upper case 26 vertically along the side surface. The fins 65 stand erect at circumferentially predetermined intervals. The upper case 26 has, at the center of its upper surface, an upper bearing holder 66 for holding a bearing 68 to support an upper end of the rotational shaft 25 with a resin insulator cap 67 between the bearing holder 66 and the bearing 68. The upper bearing holder 66 has a central through-hole 69 that is closed with a resin cap 70.

The upper case 26 has three screw bosses (two first screw bosses 71A and one second screw boss 71B) extending vertically at circumferentially equal intervals on the outer circumferential surface. The screw bosses each protrude radially outward. The screw bosses 71A and 71B respectively correspond to the ridges 48A and 48B on the stator core 40. The screw bosses 71A and 71B have openings each with a tapered or rectangular cross section in their lower ends, into which the ridges 48A and 48B are to be fitted. The upper case 26 has, on its outer circumferential surface, a slit 72 that extends upward from the lower end between the ridges 48A and 48B.

The lower case 27 includes an end face portion 73 and a cylindrical portion 75. The end face portion 73 is circular, and has a lower bearing holder 74 at the center in the same manner as the upper case 26. The cylindrical portion 75 stands upward on the outer periphery of the end face portion 73. The lower bearing holder 74 holds a bearing 76 to support the rotational shaft 25 that extends through the lower bearing holder 74. The cylindrical portion 75 has four bosses 77 for fastening the lower case 27 to the base 28 by screwing. The bosses 77 face downward at circumferentially equal intervals on the outer circumference.

A resin layer 78 continuously covers the inner surface of the end face portion 73 excluding the lower bearing holder 74 and the inner and outer circumferences of the cylindrical portion 75 excluding the bosses 77. The resin layer 78 has, at positions corresponding to the ridges 48A and 48B on the stator core 40, boss parts 79A and 79B that extend axially. The boss parts have the same shapes as the corresponding screw bosses 71A and 71B on the upper case 26. The boss parts 79A and 79B have through-holes each with a tapered or rectangular cross section in their upper ends, into which the ridges 48A and 48B are to be fitted. The boss parts 79A and 79B have recessed grooves 80 extending continuously from their lower ends.

The upper case 26 is then placed to cover the upper portion of the stator 23 with the screw bosses 71A and 71B aligned with the ridges 48A and 48B on the stator core 40, and the bearing 68 mounted on the upper end of the rotational shaft 25 held by the upper bearing holder 66. The lower case 27 is placed to cover the lower portion of the stator 23 with the boss parts 79A and 79B aligned with the ridges 48A and 48B on the stator core 40, and with the lower bearing holder 74 holding the bearing 76 mounted on the lower end of the rotational shaft 25. In this state, the boss parts 79A and 79B on the lower case 27 receive screws 81 that are inserted from below through the ridges 48A and 48B and then screwed into the screw bosses 71A and 71B on the upper case 26. The brushless motor 21 is thus covered by the upper case 26 and the lower case 27, except the outer circumference of the stator core 40 partially uncovered. This completes the motor unit 16.

The brushless motor 21 in this assembly is insulated from the motor case 22 by the insulator cap 67 between the upper case 26 and the rotational shaft 25, the upper insulator 42 between the upper case 26 and the stator core 40, and the resin layer 78 between the cylindrical portion 75 and the stator core 40. The vertical clearance between the upper case 26 and the lower case 27 can be used in mounting the stator 23 with any other axial dimension.

The motor unit 16 is placed on the base 28 with the rotational shaft 25 facing downward, and is fastened to the base 28 with screws placed in the bosses 77 from below the base 28. The end face portion 73 of the lower case 27 has arc ribs 73a (FIGS. 2 and 5) arranged concentrically on its lower surface. The arc ribs 73a are fitted with the cylindrical unit 11 to position the motor unit 16.

The motor cover 29 is placed to cover the motor unit 16 with the central portion including the upper bearing holder 66 in the upper case 26 being exposed from the motor cover 29, and with the fins 65 on the upper case 26 arranged adjacent to the inner surface of the motor cover 29.

The stator 23 is locked not to rotate with respect to the motor case 22 with the screws 81 extending through the ridges 48A and 48B, the screw bosses 71A and 71B on the upper case 26 into which the ridges 48A and 48B are fitted, and the boss parts 79A and 79B on the lower case 27.

Upper and Lower Insulators

Figure 9:
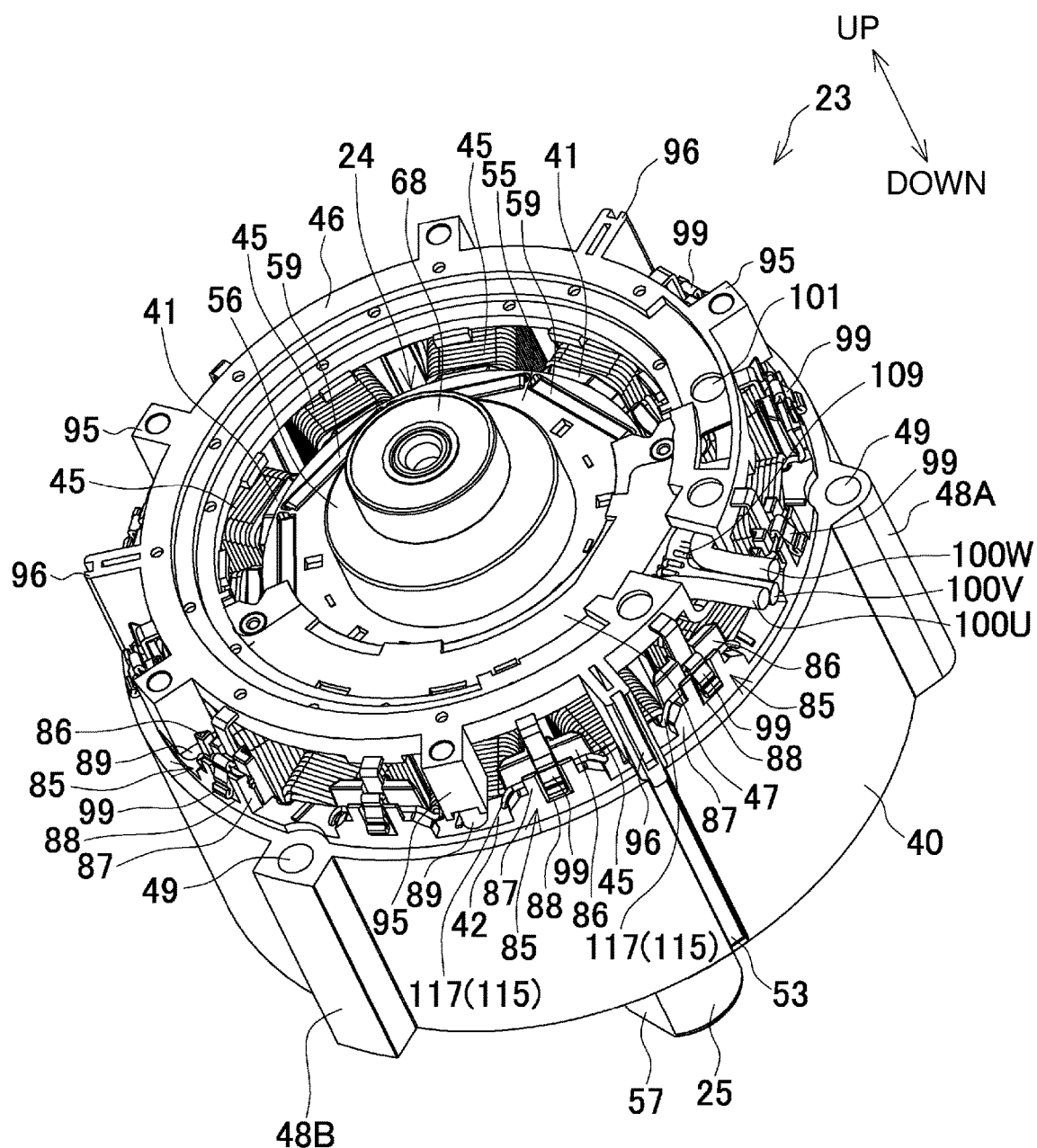
FIG. 9 is a perspective view of a brushless motor.
Figure 10:
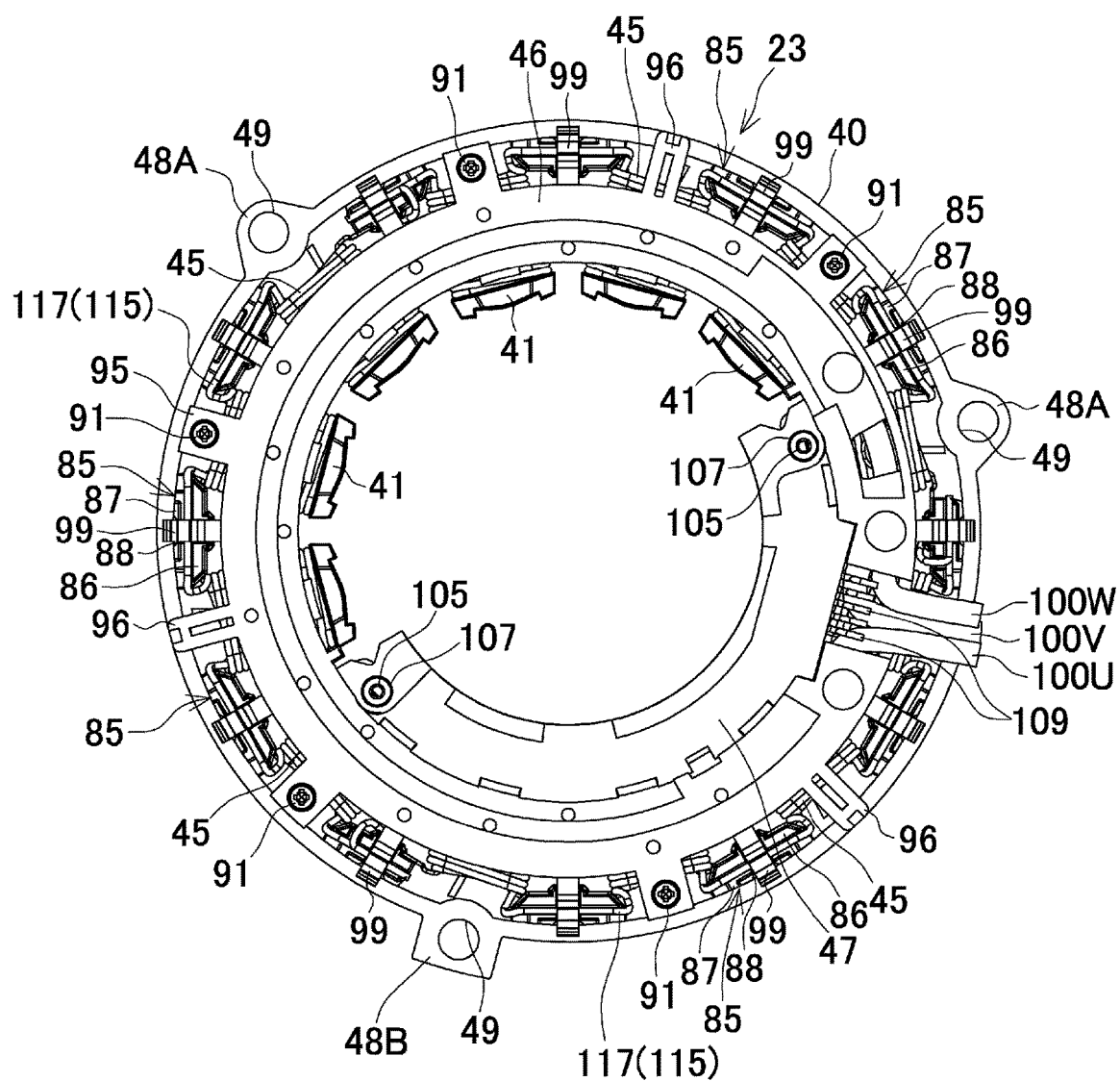
FIG. 10 is a plan view of a stator.

As shown in FIGS. 9 and 10, the upper insulator 42 is a ring formed integrally on the upper end face of the stator core 40. The upper insulator 42 has twelve terminal holders 85 at circumferentially equal intervals on its upper surface to hold fuse terminals 99 arranged on the short-circuiting member 46. Each terminal holder 85 includes an inner wall 86 standing erect on its inner periphery and an outer wall 87 standing erect on its outer periphery. The inner wall 86 and the outer wall 87 are radially spaced from each other by a distance substantially corresponding to the diameter of a wire 115. Each terminal holder 85 has, on its circumferential middle between the inner wall 86 and the outer wall 87, a fitting groove 88 to receive the fuse terminal 99. The upper insulator 42 has, on its upper surface, five protruding fastening bosses 89 for fastening the short-circuiting member 46 at positions in contact with the roots of every other tooth 41.

Figure 11:
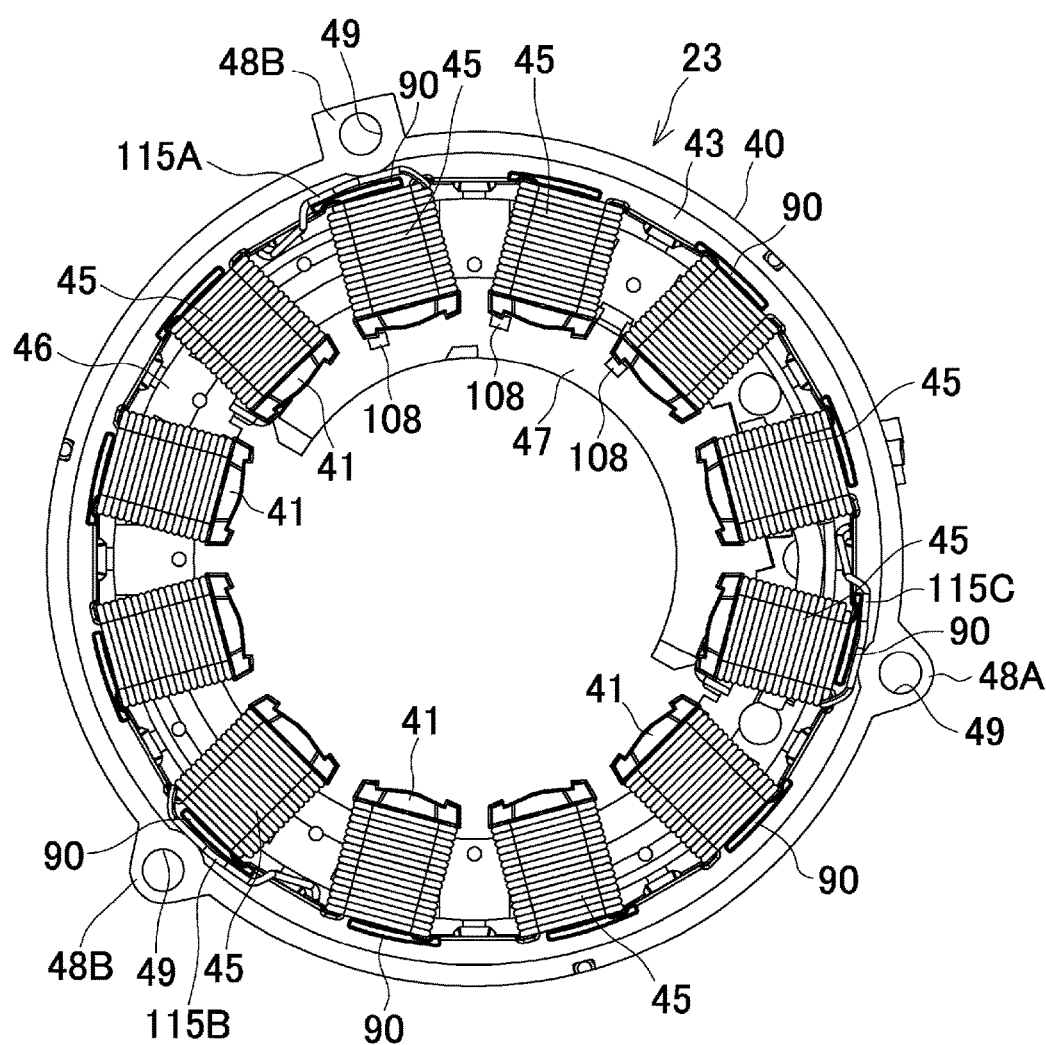
FIG. 11 is a bottom view of the stator.

As shown in FIG. 11, the lower insulator 43 is a ring formed integrally on the lower end face of the stator core 40. The lower insulator 43 has, on its lower surface, twelve guide walls 90 that stand erect circumferentially at positions slightly shifted circumferentially from the roots of the teeth 41.

Short-Circuiting Member and Sensor Circuit Board

The short-circuiting member 46 is a resin ring slightly smaller than the upper insulator 42. The short-circuiting member 46 has five square fitting bosses 95 with cylindrical hollows and three ribs 96 that protrude on the outer circumference. The fitting bosses 95 are fitted onto the corresponding fastening bosses 89 on the upper insulator 42 from above. The ribs 96 are engaged with the grooves 53 on the stator core 40.

Figure 12:
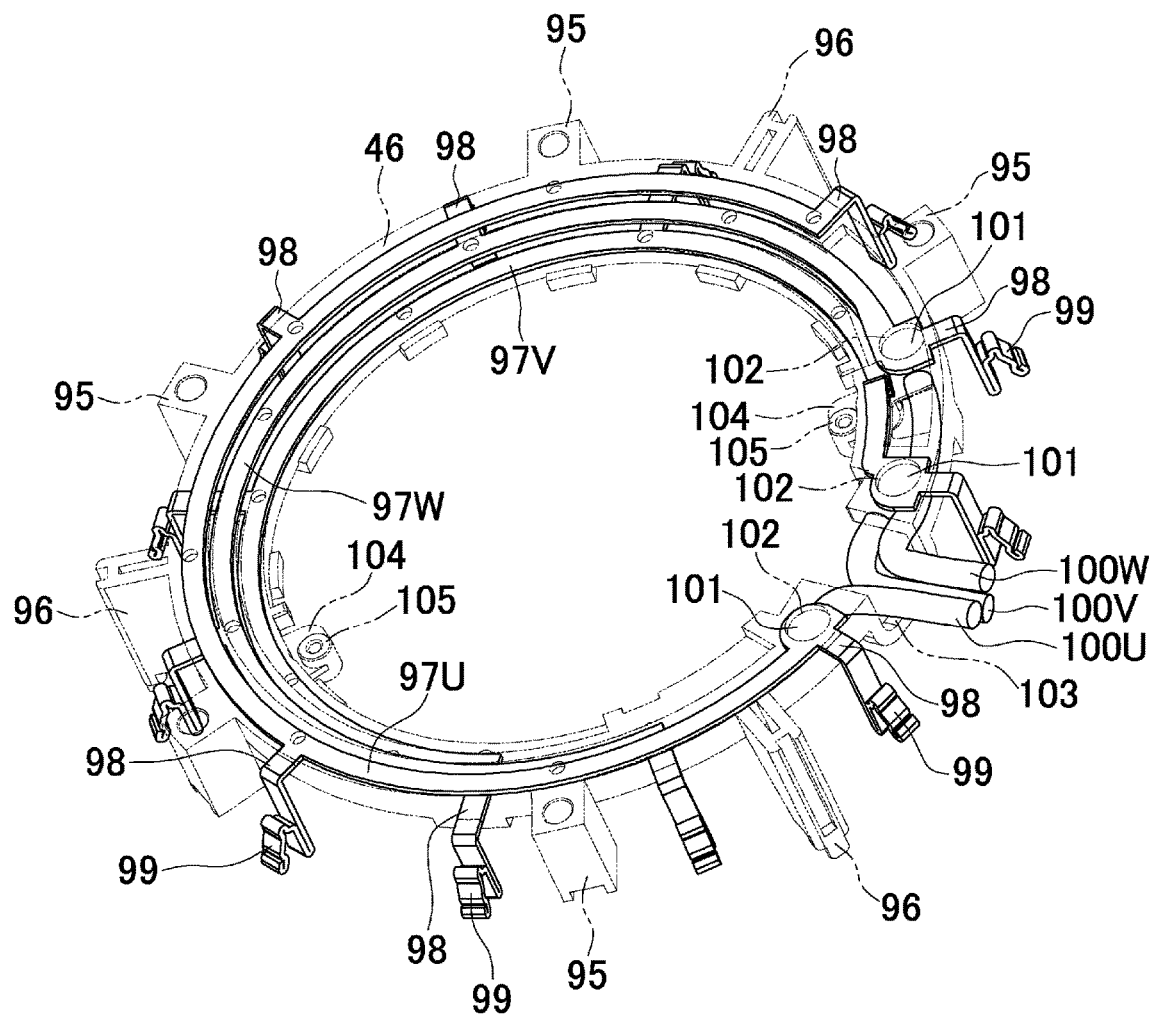
FIG. 12 is a perspective view of a short-circuiting member in which only first to third metal fittings are indicated by solid lines.
Figure 13:
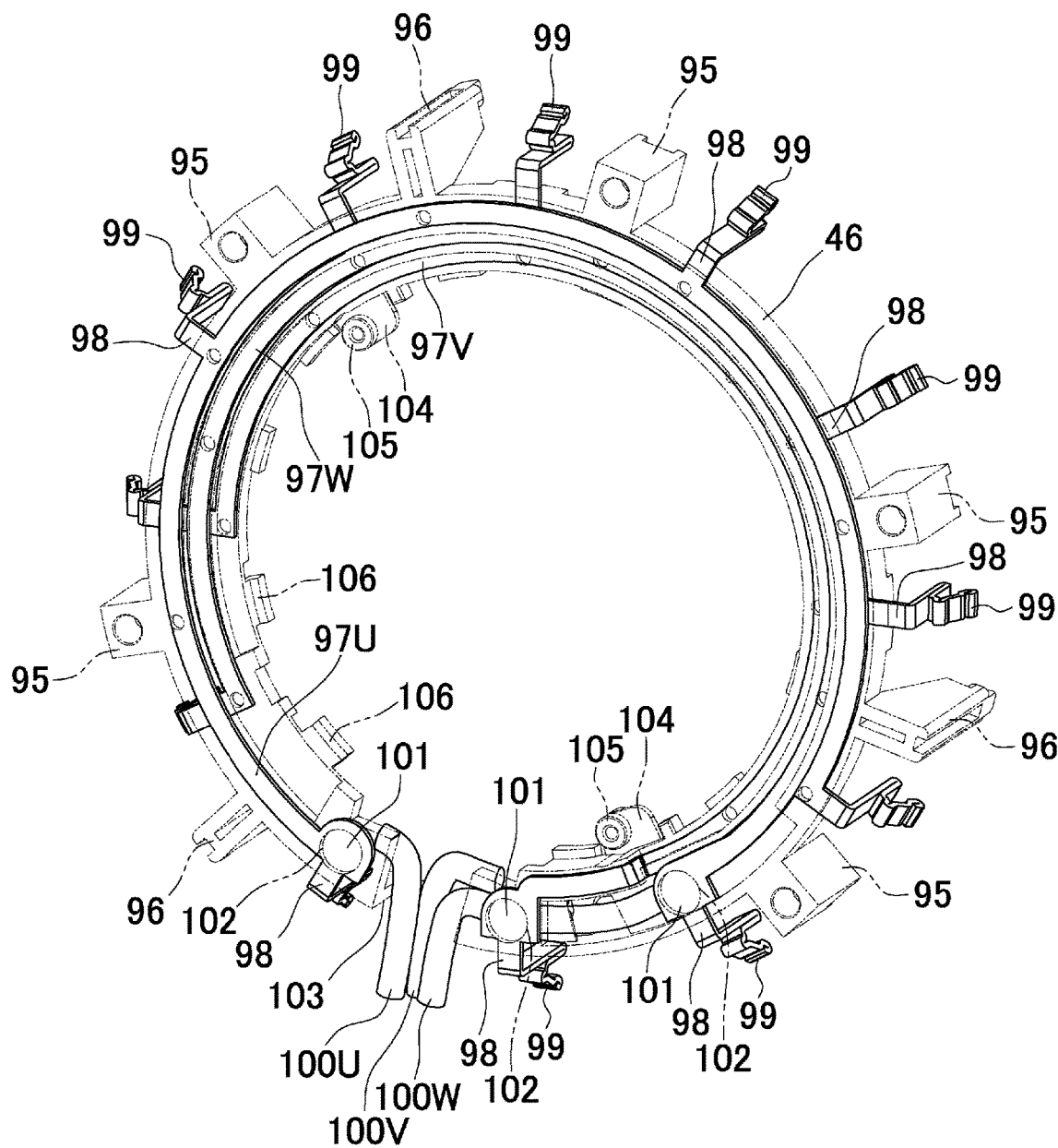
FIG. 13 is a perspective view of the short-circuiting member in which only the first to third metal fittings are indicated by solid lines.
Figure 14:
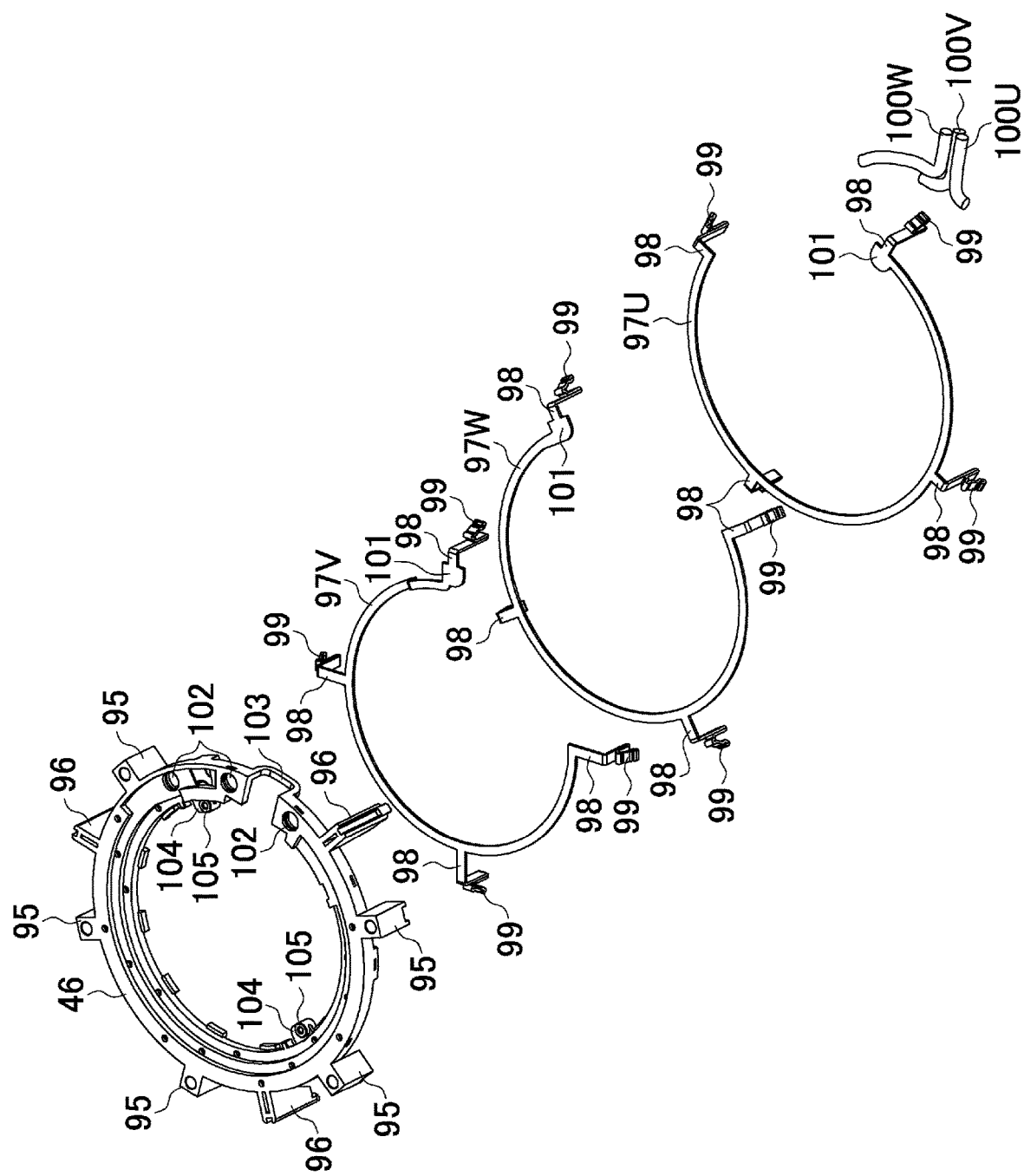
FIG. 14 is an exploded perspective view of the short-circuiting member.

The short-circuiting member 46 has a stepped shape with an axial thickness decreasing in a stepwise manner from the upper surface in the direction from the outer circumference to the inner circumference. As shown in FIGS. 12 to 14, thick parts include a first metal fitting 97U, a second metal fitting 97W, and a third metal fitting 97V that are formed by insert molding and are arranged concentrically. The first metal fitting 97U has the largest diameter and is at the outermost circumferential position or constitutes the thickest portion. The second metal fitting 97W has an intermedium diameter and is at an intermediate circumferential position inward from the first metal fitting 97U. The third metal fitting 97V has the smallest diameter and is at the innermost circumferential position inward from the second metal fitting 97W. The letters U, W, and V given to the metal fittings represent the corresponding U-phase, W-phase, and V-phase of three-phase current.

The first to third metal fittings 97U to 97V are C-shaped strip plates as viewed from above, and each have four protruding pieces 98 protruding radially outward at positions including the two ends and two points that are point-symmetric to the two ends. Each protruding piece 98 has, on its distal end, the fuse terminal 99 that is first bent downward and then folded upward and further bent outward. The first metal fitting 97U has a weld 101 for spot-welding a power supply line 100U at the root of the protruding piece 98 located at one end. The second and third metal fittings 97W and 97V also have welds 101 for spot-welding power supply lines 100W and 100V at the roots of the protruding pieces 98 at their ends opposite to the end of the first metal fitting 97U with the weld 101.

The first, second, and third metal fittings 97U, 97W, and 97V are arranged in the short-circuiting member 46 in the stated order from above with the phases each shifted circumferentially by a predetermined angle. The short-circuiting member 46 has fuse terminals 99 protruding at circumferentially and substantially equal intervals from the outer circumference surface with no contact with other terminals with the first, second, and third metal fittings 97U, 97W, and 97V are insert molded. The short-circuiting member 46 has through-holes 102 through which the welds 101 on the metal fittings 97U to 97V are to be exposed. The through-holes 102 are formed at predetermined intervals in a concentrated manner in one area defined circumferentially. The power supply lines 100U to 100V are spot-welded to the corresponding welds 101. A cutout 103, which is closed only with the lower side of the short-circuiting member 46, is formed between the welds 101. The cutout 103 allows the power supply lines 100U to 100V to be directed outward.

The short-circuiting member 46 has, at two points that are symmetric to each other on the inner circumference, support pieces 104 including mounting bosses 105 for mounting the sensor circuit board 47 and protruding toward the center. The short-circuiting member 46 has, between the support pieces 104 on the inner circumference, a plurality of receiving pieces 106 (FIG. 13) protruding toward the center for supporting the outer circumference of the sensor circuit board 47.

The sensor circuit board 47 is an arc-shaped strip plate located circumferentially inward from the short-circuiting member 46. The sensor circuit board 47 has, on its two circumferential ends, fitting holes 107 into which the mounting bosses 105 included in the support pieces 104 are fitted. The mounting bosses 105 are fitted into the fitting holes 107, and the receiving pieces 106 support the outer circumference of the sensor circuit board 47. This structure allows the short-circuiting member 46 to hold the sensor circuit board 47 on its inner circumference. The sensor circuit board 47 has, on its back surface, rotation detecting elements 108 (FIG. 11) such as Hall devices to detect the magnetic field of the permanent magnet plates 59 on the rotor 24. A signal line 109 connected to the sensor circuit board 47 and the power supply lines 100U to 100V are directed outside through the cutout 103 in the short-circuiting member 46. The position at which these lines are directed outside corresponds to the slit 72 on the upper case 26.

As described above, the short-circuiting member 46 includes, on its outer circumference, the five fitting bosses 95 receiving the fastening bosses 89 on the upper surface of the upper insulator 42 and fastened to the fastening bosses 89 with screws 91 (FIG. 10) from above. The short-circuiting member 46 also includes the three ribs 96 with their leading edges engaged with the grooves 53 on the stator core 40, and the fuse terminals 99 held by the terminal holders 85 on the upper insulator 42 for mounting the short-circuiting member 46 onto the stator 23 with the sensor circuit board 47. In particular, the ribs 96 are engaged with the grooves 53 firmly at three positions and thus anchored to stably support the short-circuiting member 46. The power supply lines 100U to 100V and the signal line 109 are directed outside through the slit 72 on the upper case 26 with a sleeve-shaped gasket 82 (FIG. 3) fitted into the slit 72.

Method for Forming Coils

Figure 15:
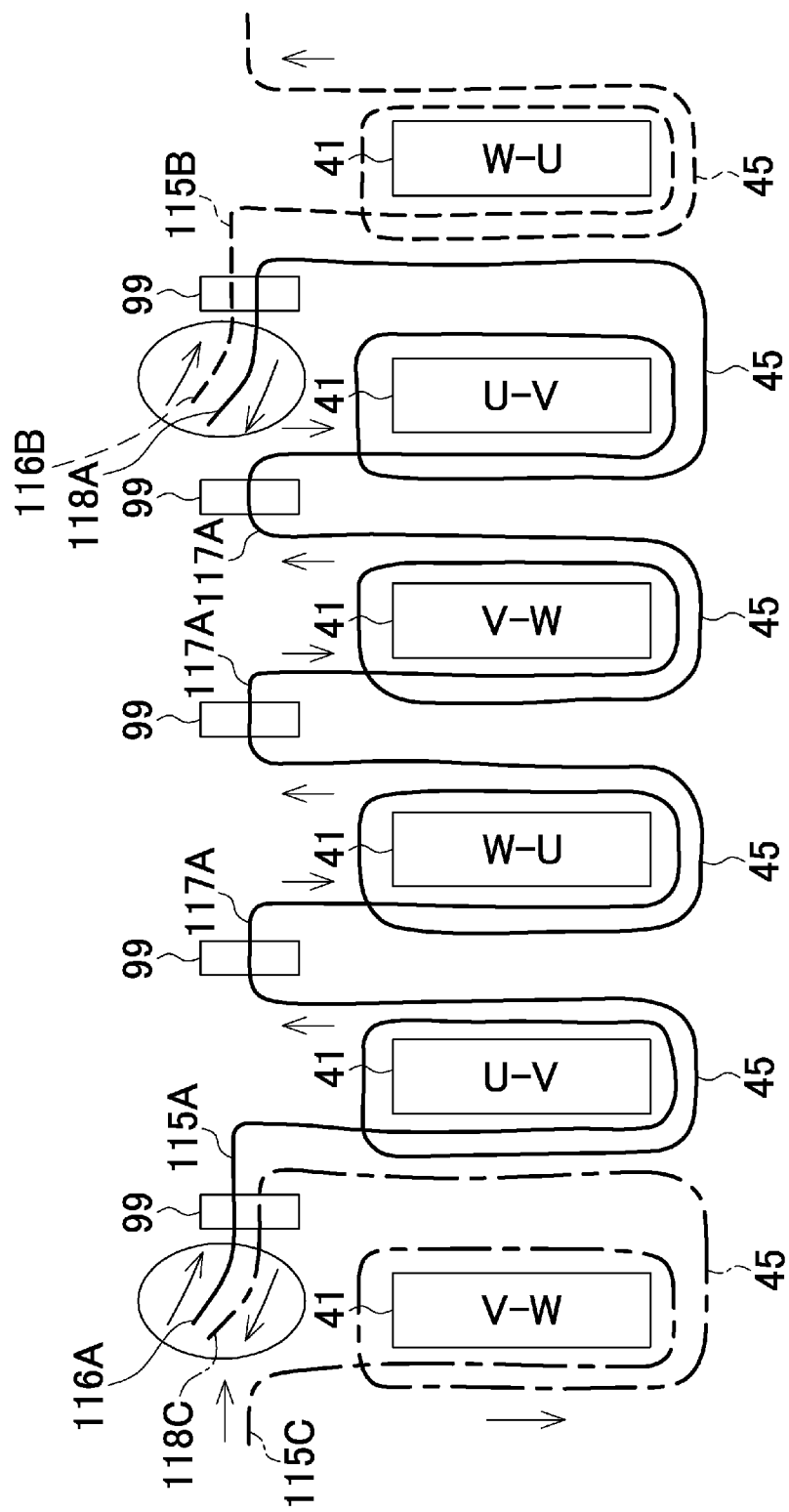
FIG. 15 is a diagram describing a method for winding coils.

As shown in FIG. 15, the coils 45 are formed by winding a single wire 115 around each of the three teeth 41 located at intervals of 120 degrees using three winding nozzles (the wire for each phase may be identified by the reference numeral followed by one of letters A to C, such as 115A, 115B, and 115C; the same applies hereafter). The wire is then wound sequentially around four teeth 41 adjacent in the circumferential direction of the stator 23 to form the twelve coils 45 at the same time. For example, the wire 115A shown in FIG. 15 has its starting end 116A first fixed on the first corresponding fuse terminal 99 and is wound sequentially around one tooth 41 after another tooth 41 that is adjacent clockwise to form the coils 45. In this case, the wire 115A is wound counterclockwise from the teeth 41. A connecting wire 117A, which is a wire portion following the formed coil 45, is directed toward the upper insulator 42 (connecting side) and fixed on the fuse terminal 99 between the teeth 41.

As shown in FIG. 11, after the four coils 45 are formed, the wire 115A is first fed toward the lower insulator 43 (opposite to the connecting side), and is then wound around the guide wall 90 at the root of the wound teeth 41 from outward. The wire 115A is then directed toward the upper insulator 42, and is fixed on the fuse terminal 99 on which a starting end 116B of another wire 115B is fixed. The wire 115A ends at this position to have a terminal end 118A. The starting end 116B of the wire 115B and the terminal end 118A of the wire 115A thus extend in the same direction. These terminal ends can be cut at the same time within the area enclosed by a circle in the figure. The same applies to the terminal end 118B of the wire 115B and the starting end 116A of the wire 115C, and the terminal end 118C of the wire 115C and the starting end 116A of the wire 115A.

Figure 16:
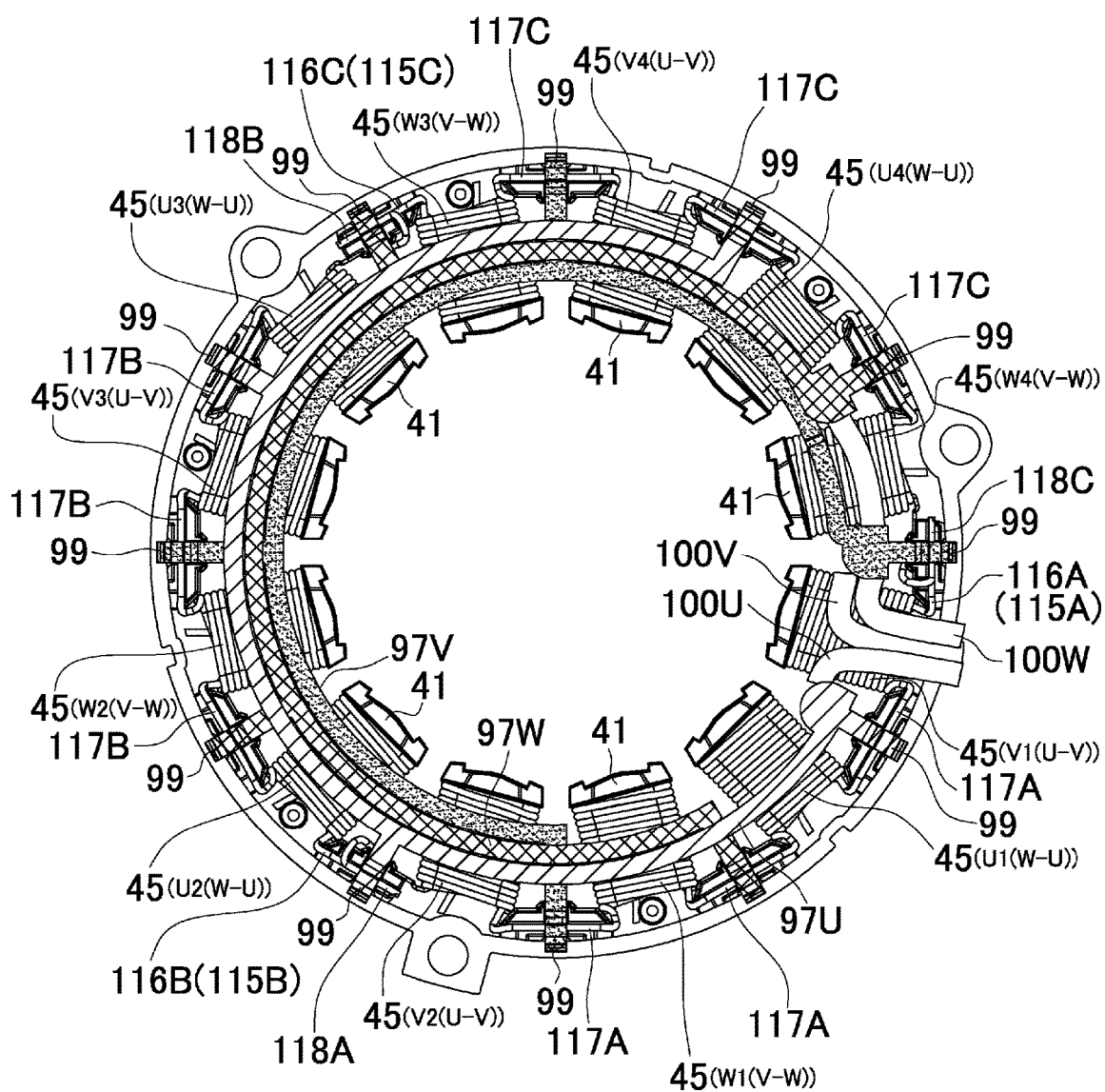
FIG. 16 is a diagram describing a connection using the first to third metal fittings as viewed from above the stator.

The first to third metal fittings 97U to 97V are arranged in the short-circuiting member 46 with their phases circumferentially shifted by one coil 45 for fusing the connecting wires 117 between the twelve coils 45, with the three coils 45 placed between the connecting wires 117 to be fused as shown in FIG. 16. In FIG. 16, the first metal fitting 97U is hatched, the second metal fitting 97W is shaded, and the third metal fitting 97V is dotted for easily distinguishing the connecting wires 117 that are fused by the first to third metal fittings 97U to 97V.

Figure 17:
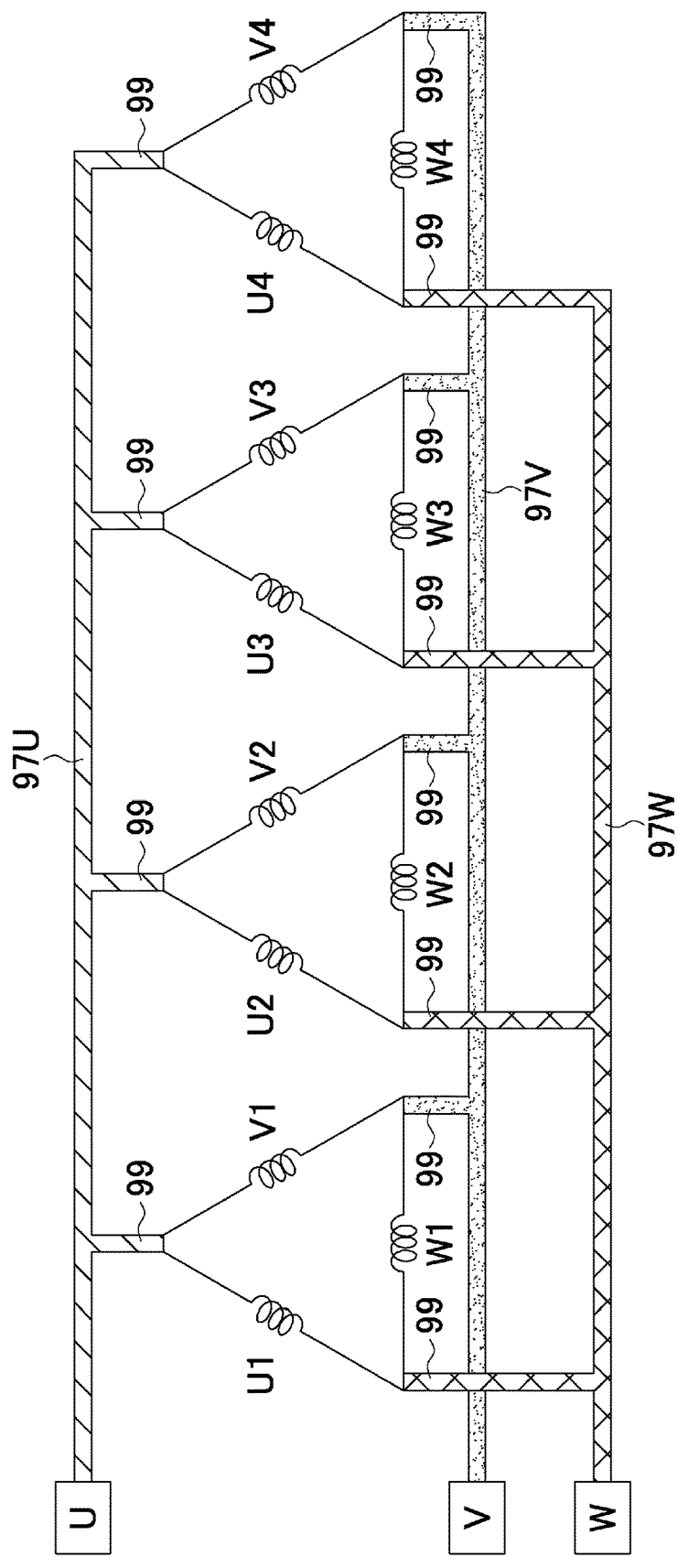
FIG. 17 is a circuit diagram of the connection using the first to third metal fittings.

The three coils 45 adjacent in the circumferential direction are delta connected by the first to third metal fittings 97U to 97V in each phase as U(W-U), V(U-V), and W(V-W). The four sets of three coils 45 are sequentially arranged adjacent to one another with the first to third metal fittings 97U to 97V. The resultant three-phase circuit has the structure shown in FIG. 17. The three-phase circuit equates to the delta connection in which four coils of each phase, or specifically coils U1 to U4, V1 to V4, and W1 to W4 are delta connected in parallel to one another.

Operation of Lawn Mower

In the lawn mower 1 according to the present embodiment, the lock-off button 9 is pressed to unlock the switch lever 8, and the switch lever 8 is pulled to turn on the main switch and transmit an ON signal from the battery pack 13 to the control circuit board included in the controller 15. A microcomputer included in the control circuit board obtains the rotational state of the rotor 24 based on a detection signal transmitted from the rotation detecting element 108 in the sensor circuit board 47. The microcomputer turns on or off a switching element mounted on the control circuit board in accordance with the obtained rotational state, and applies a current through the coils 45 of each phase included in the stator 23 sequentially to rotate the rotor 24. The rotational shaft 25 then rotates to rotate the cutting blade 20 together with the spindle 17. The handle 4 is then operated to push the base 2, thus allowing the lawn mower 1 to cut grass with the cutting blade 20 while running on the wheels 5.

In this state, the stator 23 in the brushless motor 21 is locked with the screws 81 extending through the ridges 48A and 48B, and is not rotatable with respect to the motor case 22 mounted on the base 28. In this manner, the stator 23 is locked not to rotate in a manner highly accurate and less susceptible to tolerances, and further in a reliable manner. The screws 81 extend directly through the stator core 40. This structure is less likely to bend than the structure for connecting the upper and lower cases 26 and 27 with screws 81 outside the stator core 40.

This structure also prevents the wires 115 for the coils 45 from crossing and reduces wear due to contact with each other, and thus improves durability.

The stator core 40 in the lawn mower 1 according to the present embodiment has the through-holes 49 for receiving screws (screws 81) to lock rotation of the stator 23. The stator 23 can be locked not to rotate using the highly accurate and high strength stator core 40, in place of using the upper and lower insulators 42 and 43. The stator 23 can thus be locked not to rotate in a highly accurate and strength manner.

The stator 23 has the lids (the upper case 26 and the lower case 27) on its two axial ends. The stator core 40 has, on its outer circumference, rotation locking members (ridges 48A and 48B) that are fitted with the upper case 26 and the lower case 27. This structure uses the stator core 40 to lock rotation of the stator 23 with respect to the motor case 22, and can thus lock rotation of the stator 23 in a highly accurate and reliable manner.

The stator core 40 also has, on its outer circumference, projections (ridges 48A and 48B) that are fitted with the lids (the upper case 26 and the lower case 27) to lock rotation of the stator 23. The ridges 48A and 48B have the through-holes 49 for receiving the screws 81, and thus can lock rotation of the stator 23 with respect to the motor case 22 in a highly accurate and reliable manner using the screws 81.

The ridges 48A and 48B each have a tapered cross section with a circumferential width gradually decreasing radially outward from the stator core 40. This structure prevents interference with the split molds 54 when the upper and lower insulators 42 and 43 and the insulating unit 44 are formed integrally.

The number of ridges and the cross-sectional shape of the ridges for locking rotation of the stator are not limited to the number and the shape described in the above embodiments, and may be modified as appropriate. For example, the ridges may not extend across the entire vertical length of the stator core, and may be shorter than the entire length and may be arranged in other parts such as at the upper end, the lower end, or in an intermediate part. The ridges may be eliminated, and the stator may be locked not to rotate with screws extending through the stator core instead.

Figure 18:
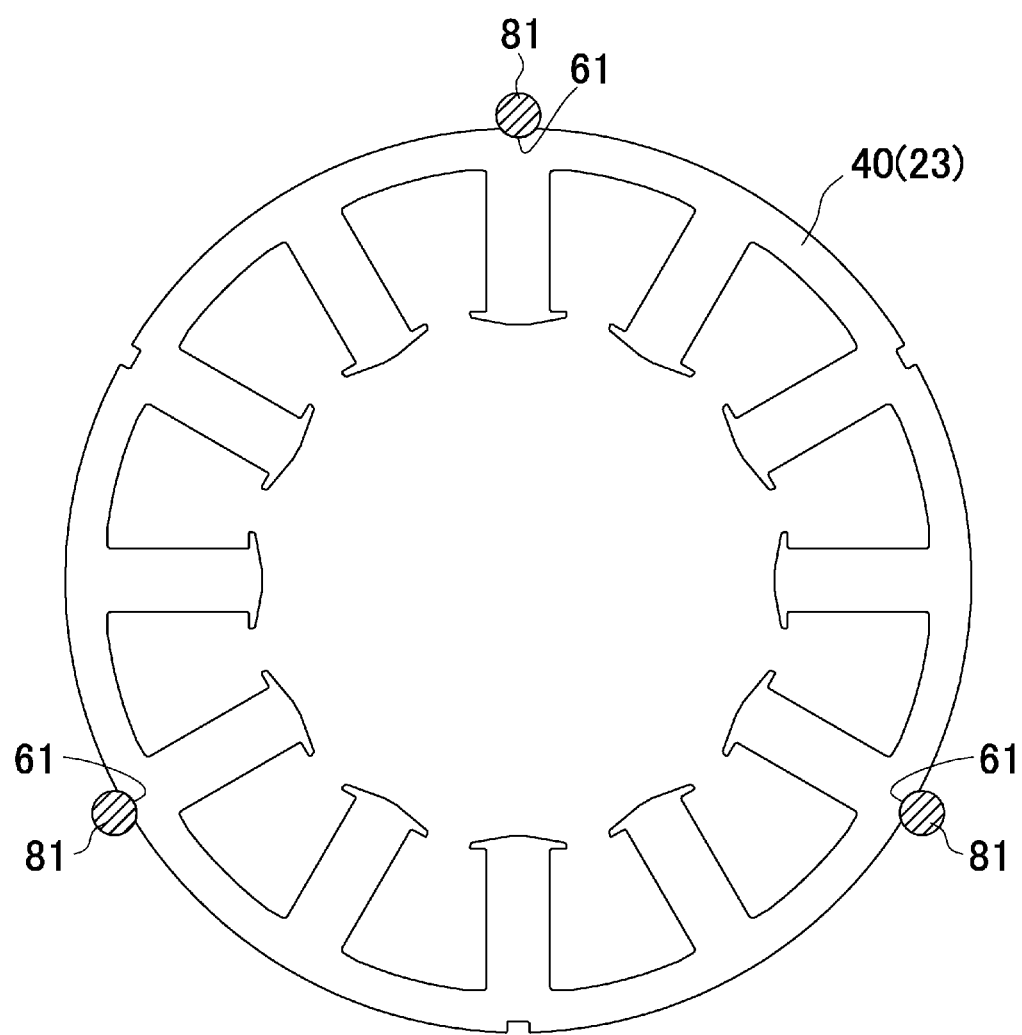
FIG. 18 is a diagram describing locking rotation of the stator according to a modification.

The stator may be locked not to rotate with parts other than the ridges or the through-holes. For example, as shown in FIG. 18, the screws 81 may be fitted into recesses 61 extending axially on the outer circumference surface of the stator core 40 to lock rotation of the stator 23. In this case as well, the stator core 40 with high accuracy and reliability can be used to lock rotation of the stator 23.

Further, a through-hole and a recess may be used in combination to lock rotation of the stator. The screws may include bolts. When the motor case is not used, the stator may be locked with a through-hole or a recess not to rotate with respect to the motor housing or other components.

Although the brushless motor is fastened to the housing with the motor case in the electric work machine described above, the brushless motor may be directly screwed and fastened to the housing using the through-holes in the stator core in the electric work machine. In this case, the ridges may be fitted with the housing.

When the ridges are fitted with the housing for locking rotation, the brushless motor may be held and fastened between divided housings. In this case, the through-hole may be eliminated.

In the above embodiment, the motor case includes the upper case and the lower case. However, this positional relationship is a mere example for ease of explanation. For some electric work machines, the motor case may include right and left cases, front and rear cases, or diagonally split cases.

The brushless motor may be fastened to the housing simply with one of the lids of, for example, the upper case. This structure can eliminate the lid of the other case, and thus further eases the assembly.

The stator core may include fins for dissipating heat. The motor case may be connected with a material with high thermal conductivity to improve heat dissipation.

In the lawn mower 1 according to the embodiment, the brushless motor 21 includes the four three-phase coils 45 that are delta connected in parallel in each phase. Thus, the wires 115A to 115C can have a smaller diameter than in a star connection to produce the same output power, and thus improve winding during manufacture. This structure allows use of thinner winding nozzles, and increases space efficiency, and thus achieves high output power.

More specifically, the upper insulator 42 receives metal sheets (first to third metal fittings 97U to 97V). The metal sheets (first to third metal fittings 97U to 97V) are used to short-circuit the connecting wires 117 between the coils 45 wound around the teeth 41 adjacent to each other in the circumferential direction of the stator core 40 with the upper insulator 42 between the wires and the teeth, forming a delta connection. This structure enables a connection without complex connecting wires and crossing wires, thus increasing productivity and reducing wear of the wires 115 due to contact with each other.

The brushless motor 21 includes the twelve three-phase coils 45. The twelve three-phase coils 45 are formed by three continuous wires 115. Each wire 115 is used to form four coils 45 adjacent to each other in the circumferential direction of the stator core 40. The starting end 116 of the first wire 115 and the terminal end 118 of the second wire 115 circumferentially adjacent to each other are electrically connected to the first to third metal fittings 97U to 97V in the same direction with respect to the short-circuiting member 46. The starting end 116 and the terminal end 118 of each wire 115 can be cut at the same time. The productivity can thus be improved.

The method for winding wires is not limited to the method described in the above embodiments. The coils may be formed using one or two, or four or six winding nozzles, and one or two, or four or six wires. For a single winding nozzle, a single wire is wound around all the twelve teeth (12×1). For two winding nozzles, two wires are wound around the sets of six teeth (6×2). For four winding nozzles, four wires are wound around the sets of three teeth (3×4). For six winding nozzles, six wires are wound around the sets of two teeth (2×6).

Although the use of a single winding nozzle increases the time taken to wind the wire around the teeth, the use of fewer winding nozzles, or specifically a single winding nozzle, downsizes the equipment and reduces the cost. The use of more winding nozzles shortens the time taken for wire winding, but upsizes the equipment and increases the cost.

The three winding nozzles are used in the above embodiment to balance between the time taken for wire winding and the size of the equipment. One or two winding nozzles may be used to simplify the equipment, whereas four or six winding nozzles may be used to shorten the winding time.

Each phase may contain five or more coils in parallel, instead of four coils.

The metal sheets are not limited to the first to third metal fittings described in the above embodiments and may have other shapes. For example, the metal sheets may be wider, or may not be arranged concentrically but may be axially overlapped in a contactless manner.

The electric work machines in the above embodiments of the present invention include gardening tools such as chain saws, hedge trimmers, lawn mowers, and blowers, and power tools such as angle drills, grinders, hammers, hammer drills, circular saws, and reciprocating saws.

REFERENCE SIGNS LIST

1 lawn mower
2 base
3 body
4 handle
10 body housing
15 controller
16 motor unit
17 spindle
20 cutting blade
21 brushless motor
22 motor case
23 stator
24 rotor
25 rotational shaft
26 upper case
27 lower case
40 stator core
40a steel plate
41 teeth
42 upper insulator
43 lower insulator
45 coil
46 short-circuiting member
47 sensor circuit board
48A, 48B ridge
50A, 50B protrusion
54 split mold
55 rotor core
65 fin
71A, 71B screw boss
79A, 79B boss part
81 screw
85 terminal holder
97U to 97V first to third metal fittings
99 fuse terminal
115 wire

What is claimed is:

1. An electric work machine, comprising:
a brushless motor as a driving source, the brushless motor including
a stator including
a cylindrical stator core including a plurality of teeth protruding inwardly, and
insulators each fixed to each of axial front and rear end faces of the stator core;
a rotor;
twelve coils in three phases wound around the stator with a delta connection in which each phase includes four coils connected in parallel; and
a plurality of metal sheets short-circuiting connecting wires between the coils wound around the teeth adjacent to one another in a circumferential direction of the stator core to form the delta connection; wherein
the coils are wound around the teeth with the insulator in between,
the twelve coils in the three phases include three continuous wires, and
each wire is wound into four coils adjacent to one another in the circumferential direction of the stator core, and
a starting end of a first wire of the three wires and a terminal end of a second wire adjacent to each other in the circumferential direction are electrically connected to the metal sheets in the same direction.

2. The electric work machine according to claim 1, wherein
the electric work machine includes three metal sheets, and
each of the metal sheets is connected to the coils in the three phases at four positions.

3. The electric work machine according to claim 2, wherein
each of the metal sheets is connected to three lead wires.

4. The electric work machine according to claim 3, wherein
the metal sheet extends circumferentially in circular shape, and
the three lead wires are connected to the metal sheet at the same position in a circumferential direction as the coils in the three phases are short-circuited to the metal sheet.

5. The electric work machine according to claim 2, further comprising:
a resin layer holding the three metal sheet in an insulated state; and
a sensor circuit board configured to detect rotation of the rotor.

6. The electric work machine according to claim 5, wherein
the sensor circuit board has a semi-circular ring shape.

7. An electric work machine, comprising:
a brushless motor including
a stator including
a first tooth around which a first coil is wound, and
a second tooth around which a second coil is wound,
a plurality of metal sheets electrically connected to the first coil and the second coil, and
a rotor; and
an output unit drivable by a rotation of the rotor,
wherein in the stator, an end of the first coil and an end of the second coil are electrically connected to the metal sheets in the same direction.

8. The electric work machine according to claim 7, wherein
the stator includes
a cylindrical stator core including the first tooth and the second tooth protruding inwardly, and
insulators each fixed to each of axial front and rear end faces of the stator core.

9. The electric work machine according to claim 8, wherein
the plurality of metal sheets short-circuit connecting wires between the coils wound around the teeth adjacent to one another in a circumferential direction of the stator core to form a delta connection.

10. The electric work machine according to claim 7, wherein
the electric work machine includes three metal sheets,
the electric work machine further comprising:
a resin layer holding the three metal sheet in an insulated state; and
a sensor circuit board configured to detect rotation of the rotor, the sensor circuit board fixed to the resin layer.

11. The electric work machine according to claim 10, wherein
the sensor circuit board has a semi-circular ring shape.

12. The electric work machine according to claim 7, wherein the rotor is located circumferentially inward from the stator.

* * * * *